United States Patent [19]

Shimofuruta

[11] Patent Number: 4,605,288

[45] Date of Patent: Aug. 12, 1986

[54] ZOOM INTERLOCKING MECHANISM FOR BINOCULAR

[75] Inventor: Akihiro Shimofuruta, Saitamaken, Japan

[73] Assignee: Kamakura Koki Kabushiki Kaisha, Japan

[21] Appl. No.: 725,119

[22] Filed: Apr. 19, 1985

[30] Foreign Application Priority Data

Apr. 20, 1984 [JP] Japan ............................ 59-57396[U]

[51] Int. Cl.[4] .......................... G02B 7/06; G02B 23/00
[52] U.S. Cl. .................................................... 350/552
[58] Field of Search ................ 350/552, 551, 560, 570

[56] References Cited

U.S. PATENT DOCUMENTS 2,602,371 7/1952 Harford .............................. 350/552

FOREIGN PATENT DOCUMENTS 269445 1/1914 Fed. Rep. of Germany ...... 350/552
966345 8/1957 Fed. Rep. of Germany ...... 350/552

Primary Examiner—Jon W. Henry
Attorney, Agent, or Firm—Steinberg & Raskin

[57] ABSTRACT

A binocular having left and right zoom mechanisms operatively associated with each other by a belt transmission has a zoom interlocking mechanism which includes an adjustment plate. Tightening pulleys incorporated in the belt transmission between the left and right zoom mechanisms adjust tension in the belt so that the belt is kept at a constant tension. This results in both telescopic optical systems being maintained at the same magnification independently of their rotation around the central shaft for the adjustment of interpupillary distance.

3 Claims, 4 Drawing Figures

ZOOM INTERLOCKING MECHANISM FOR BINOCULAR

BACKGROUND OF THE INVENTION

The present invention relates to a zoom interlocking mechanism for a binocular. More particularly, the invention relates to a zoom interlocking mechanism adapted to connect and drive zoom mechanisms of left and right telescopic optical systems via a belt.

In a known binocular having a zoom mechanism for variation of magnification, the left and right telescopic optical systems are integrated by the respective support arms connected to each other for rotation around the central shaft. The left and right zoom mechanisms are interconnected by a gear train including a central gear coaxially mounted on the central shaft. In a relatively large-sized binocular, the zoom operating member is pivotally or rotatably mounted on the central shaft, so that the left and right zoom mechanisms may be simultaneously driven by the central gear and the associated gear trains arranged at the left and right sides, relative to said central gear as said operating member is rotated. Such a binocular of prior art is disclosed in the U.S. Pat. No. 4,171,865 of the present applicant. In a relatively small-sized binocular, the zoom operating member is associated with one of the zoom mechanisms, so that rotation of said operating member causes both zoom mechanisms to be simultaneously driven by the gear train.

In the aforedescribed binoculars well known in the art, rotation of both support arms around the central shaft for interpupillary distance adjustment results in uneven rotation of the associated gears arranged at the left and right sides relative to the central gear. Consequently, the left and right zoom mechanisms are unevenly driven, so that the magnifications of both telescopic optical systems have different values.

Furthermore, a backlash inevitably occurs in the gear transmission mechanism. In a conventional, particularly compact, binocular, the backlash causes the magnification of the left and right telescopic optical systems to be disadvantageously uneven.

Also, the transmission driving mechanism using the gear is inconvenient, because its function is not smooth, mechanical engagement produces noise and a greater than negligible transmission loss occurs.

The aforedescribed drawbacks of the gear transmission mechanism have inevitably necessitated a construction too complicated to be practically realized. To overcome these drawbacks, it has been proposed to replace the gear transmission mechanism by the belt transmission mechanism.

SUMMARY OF THE INVENTION

The principal object of the invention is to provide a zoom interlocking mechanism for a binocular, which mechanism eliminates the drawbacks of the gear transmission mechanism.

An object of the invention is to provide a zoom interlocking mechanism for a binocular, which mechanism eliminates the drawbacks of the belt transmission mechanism.

Another object of the invention is to provide a zoom interlocking mechanism for a binocular, which mechanism avoids uneven magnification in the left and right telescopic optical systems due to interpupillary distance adjustment.

Still another object of the invention is to provide a zoom interlocking mechanism for a binocular, which mechanism operates smoothly.

Yet another object of the invention is to provide a zoom interlocking mechanism for a binocular, which mechanism prevents uneven magnification of the left and right telescopic optical systems due to a backlash in the transmission mechanism.

The foregoing objects are achieved, in accordance with the present invention, by pivotally mounting an adjustment plate on the other support arm in a zoom binocular having a belt transmission mechanism. A pair of tightening pulleys are pivotally mounted on the adjustment plate at eccentric positions. The tightening pulleys are biased to deflect belt portions between the central pulley and the annular pulley from the outer tangential lines connecting said central pulley and said annular pulley. The adjustment plate is operatively associated with the one support arm, so that said adjustment plate is rotated as said one support arm is rotated around the central shaft, and, in the rotatable adjustment of the support arms around said central shaft for adjustment of the interoptical axis distance of the telescopic systems, the tightening pulley acting on the belt portion of the tension side is moved together with said adjustment plate toward the outer tangential line while the tightening pulley acting on the belt portion of the slack side is moved away from said outer tangential line, so that the two belt portions are maintained at the same tension. Consequently, the zoom mechanisms are not influenced by the operation of interpupillary distance adjustment and the magnification of both telescopic optical systems is kept the same.

A zoom interlocking mechanism for a binocular has a pair of support arms, each provided with a telescopic optical system having an associated zoom mechanism, annular pulleys associated with respective zoom mechanisms, a central shaft affixed to one of the support arms, the other of the support arms being mounted on the central shaft for rotation within a predetermined angular range about the shaft, a central pulley coaxially mounted on the central shaft, tightening pulleys interposed between the central pulley and the annular pulleys, and a length of belt extending along a path defined by the central pulley, the annular pulleys and the tightening pulleys.

In accordance with the invention, the zoom interlocking mechanism comprises an adjustment plate pivotally mounted on the other of the support arms. Two of the tightening pulleys are rotatably mounted on the adjustment plate at eccentric positions and biased so as to deflect portions of the belt extending between the central pulley and the annular pulley away from the outer tangential lines connecting the central pulley to the annular pulley. The adjustment plate is operatively associated with the one of the support arms in a manner whereby the adjustment plate is rotated as the support arms are rotated around the central shaft. That one of the tightening pulleys mounted on the adjustment plate and acting on the belt portion of a tension side of the belt is moved together with the adjustment plate so as to urge the belt portion toward the outer tangential lines, while the other of the tightening pulleys mounted on the adjustment plate acting on the belt portion of a slack side of the belt is moved together with the adjustment plate so as to urge the belt portion of the slack side away from the outer tangential lines, thereby maintaining the two belt portions at the same tension before, during and after adjustable rotation of the support arms around the central shaft for varying the interoptical axis distance of the telescopic optical systems.

A pin pivotally mounts the adjustment plate on the other of the support arms, and a fixed pin is affixed to the one of the support arms. The adjustment plate has an outer periphery and a groove formed in the plate at the outer periphery and substantially parallel to the pin whereby the fixed pin is engageable in the groove.

The belt may be a timing belt.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
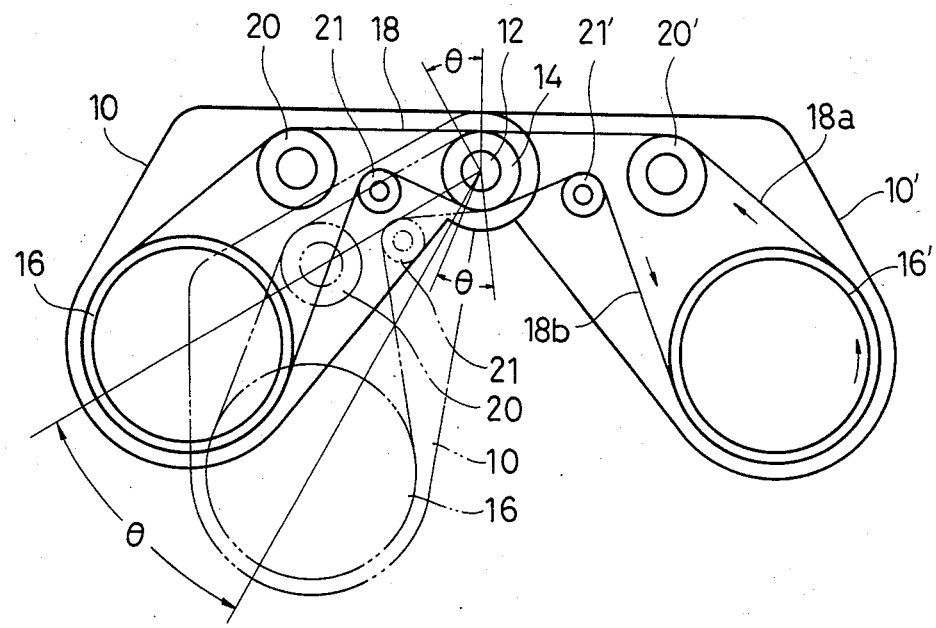
FIG. 1 is a schematic plan view illustrating a basic zoom mechanism for a binocular using a basic belt transmission mechanism known in the art and interlocking the left and right zoom mechanisms.

In the embodiment of the prior art, shown in FIG. 1, a left support arm 10 and a right support arm 10' are provided for associated telescopic optical systems (not shown in the Figs.) which are, in turn, provided with associated zoom mechanisms adapted for variation of magnification. A central shaft 12 is affixed to the left support arm 10. The right support arm 10' is mounted on the central shaft 12 for rotation within a limited angle of $\theta$ (rad). Both support arms 10 and 10' may be rotated around the central shaft 12 to adjust the distance between oculars of both telescopic optical systems, that is, the so-called interpupillary distance.

A central pulley 14 is coaxially mounted on the central shaft 12 for rotation integrally with said shaft. Annular pulleys 16 and 16' are mounted on and integral with associated zoom rotating cylinders (not shown in the Figs.) for varying the magnification of both telescopic optical systems.

A length of belt 18 extends along its path defined by the annular pulley 16, the central pulley 14 and the annular pulley 16', so as to transmit rotation of one annular pulley 16 or 16' to the other annular pulley 16' or 16, respectively.

Tightening pulleys 20 and 21 are journaled in the left support arm 10 between the annular pulley 16 and the central pulley 14 and bear against the belt 18. Tightening pulleys 20' and 21' are journaled in the right support arm 10' between the annular pulley 16' and the central pulley 14 and bear against the belt 18. The tightening pulleys 20, 21, 20' and 21' guide the belt 18 substantially along the outer configuration of both support arms 10 and 10' and, at the same time, deflect said belt 18 with respect to outer tangential lines connecting the central pulley 14 and the annular pulleys 16 and 16' so that said belt is given a predetermined tension and is normally free from slack.

One of the zoom rotating cylinders includes an operating member (not shown in the Figs.) connected thereto to rotate said zoom rotating cylinder. As a result, rotation of the operating member causes the one zoom rotating cylinder to rotate together with its associated annular pulley 16 or 16'. This, in turn, causes the annular pulley 16' or 16 and the other zoom rotating cylinder to be rotated by the belt 18, correspondingly varying the magnification. Thus, the respective zoom rotating cylinders are rotated through an equal angle and both telescopic optical systems are maintained at the same magnification, since the possibility of a backlash occurring in the belt transmission is negligible.

The function of the respective members in the adjustment of the interpupillary distance of the aforedescribed binocular is as follows. FIG. 1 shows the left and right support arms 10 and 10' at the maximum interpupillary distance. The central pulley 14 has a radius r, the annular pulley 16' has a radius R, and the maximum rotatable angle of both support arms 10 and 10' around the central shaft 12 is $\theta$ (rad).

It is assumed that both support arms 10 and 10' are rotated around the central shaft 12 from the position shown in FIG. 1 by the angle $\theta$ so as to reduce the interpupillary distance. The central pulley 14 is mounted on the central shaft 12 for rotation integrally with said shaft, so that said central pulley is stationary relative to said central shaft unless a frictional force between both components is overcome. Thus, the central pulley 14 rotates together with the central shaft 12 and the left support arm 10. The effect of such rotation is identical to that of counterclockwise rotation of the left support arm 10 together with the central shaft 12 and the central pulley 14 through the angle $\theta$, with the right support arm 10' being fixed. A position resulting from such rotation is shown by two-dot-chain lines in FIG. 1.

During this rotation operation for the adjustment of the interpupillary distance, an upper belt portion 18a of the belt 18 extending between the pulleys 14 and 16' is wound on the central pulley 14 by an amount $r\theta$ to increase tension, while a lower belt portion 18b is drawn out from said central pulley by an amount $r\theta$ to decrease tension. In consequence, a difference in tension in the belt portions 18a and 18b causes the annular pulley 16' to be rotated counterclockwise with respect to the right support arm 10' by an amount $r\theta/R$ (rad). The zoom rotating cylinder associated with the annular pulley 16' is correspondingly rotated. Thus, the right telescopic optical system has a magnification different from that prior to the adjustment of the interpupillary distance and, therefore, also different from the left telescopic optical system.

Furthermore, when both support arms 10 and 10' are rotated in the direction opposite that aforementioned, so as to enlarge the interpupillary distance, such rotation results in the left and right telescopic optical systems having different magnifications. This is because the upper belt portion 18a is drawn out from the central pulley 14 by an amount of $r\theta$ while the lower belt portion 18b is wound on the central pulley 14 by an amount $r\theta$, resulting in the annular pulley 16' being rotated clockwise by an amount $r\theta/R$ (rad) and the right telescopic optical system having a magnification different from that prior to said adjustment of interpupillary distance.

Figure 2:
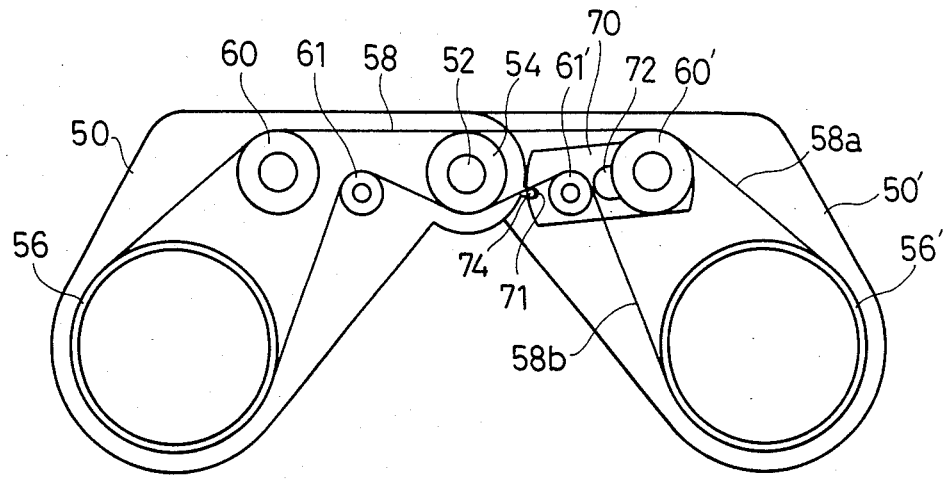
FIG. 2 is a schematic plan view showing an embodiment of the binocular zoom interlocking mechanism of the present invention.
Figure 3:
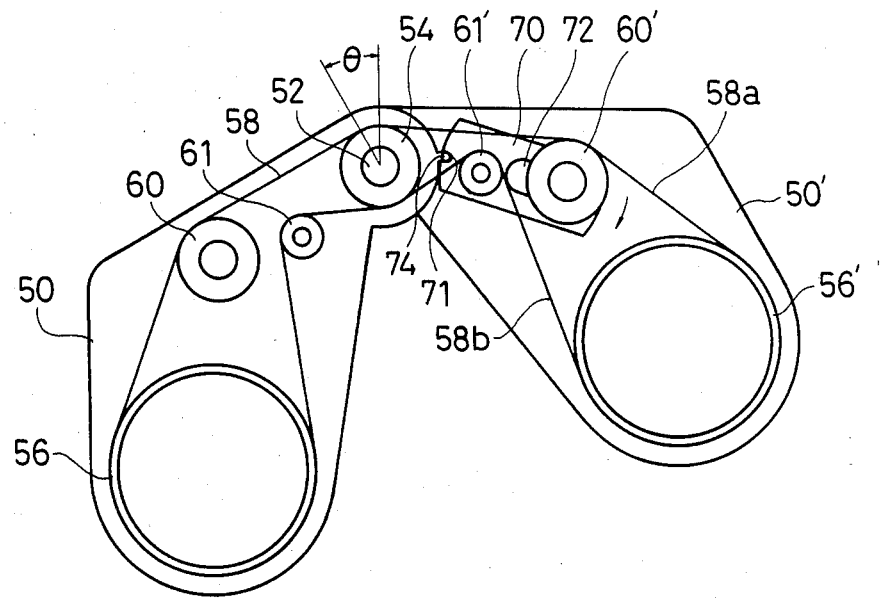
FIG. 3 is a schematic plan view showing the embodiment of FIG. 2 at the shortest interpupillary distance, to illustrate a principle on the basis of which the mechanism of the present invention functions.

FIGS. 2 and 3 are plan views schematically illustrating an embodiment of the present invention. In FIGS. 2 and 3, left and right support arms 50 and 50', respectively, are provided for associated telescopic optical systems (not shown in the Figs.) which are, in turn, provided with associated zoom mechanisms for varying the magnification. A central shaft 52 is affixed to the left support arm 50. The right support arm 50' is mounted on the central shaft 52 for rotation within a limited angle of $\theta$ (rad). Both support arms 50 and 50' may be rotated around the central shaft 52 to adjust the interocular distance of both telescopic optical systems, that is, the so-called interpupillary distance.

A central pulley 54 is coaxially mounted on the central shaft 52 for rotation integrally with said shaft. Annular pulleys 56 and 56' are mounted on and integral with associated zoom rotating cylinders (not shown in the Figs.) for varying the magnification of both telescopic optical systems.

A length of belt 58 extends along its path defined by the annular pulley 56, the central pulley 54 and the annular pulley 56', so as to transmit rotation of one annular pulley 56 or 56' to the other annular pulley 56' or 56, respectively.

Tightening pulleys 60 and 61 are journaled in the left support arm 50 between the annular pulley 56 and the central pulley 54 and bear against the belt 58. Tightening pulleys 60' and 61' are journaled in the right support arm 50' between the annular pulley 56' and the central pulley 54 and bear against the belt 58, as hereinafter described.

One of the zoom rotating cylinders includes an operating member (not shown in the Figs.) connected thereto to rotate such zoom rotating cylinder. Rotation of the operating member causes the one zoom rotating cylinder to rotate together with its associated annular pulley 56 or 56' and the other zoom rotating cylinder to be simultaneously rotated by the belt 58 through rotation of the other annular pulley 56' or 56. The respective zoom rotating cylinders are rotated through an equal angle and both telescopic optical systems are maintained at the same magnification, since the possibility of a backlash occurring in the belt transmission is negligibly small.

The structure and function described with regard to FIGS. 2 and 3 are substantially identical to those described with regard to the embodiment of the prior art shown in FIG. 1.

In accordance with the invention, an adjustment plate 70 is pivotally mounted on a pin 72 affixed to the right support arm 50'. The tightening pulleys 60' and 61' are pivotally mounted on the adjustment plate 70 at eccentric positions. A groove 71 is provided in the side of the outer periphery of the adjustment plate 70 facing the central shaft 52. The groove 71 extends parallel to the pin 72, so that a pin 74, affixed to the left support arm 50, may be engaged in said groove. In this manner, rotation of the support arms 50 and 50' around the central shaft 52 causes the adjustment plate 70 to be rotated around the pin 72, urging the pin 74 into the groove 71.

The function of the respective members as both support arms 50 and 50' are rotated around the central shaft 52 for adjustment of the interpupillary distance is now described. The adjustment of the interpupillary distance, particularly, the reduction of the interpupillary distance, will be considered with reference to FIG. 2, which shows the support arms 50 and 50' at the maximum interpupillary distance.

The central pulley 54 is stationary with respect to the left support arm 50 for the same reason as described in connection with FIG. 1. Accordingly, the operation to reduce the interpupillary distance is equivalent to an operation in FIG. 2 wherein, with the right support arm 50' being fixed, the left support arm 50 is rotated counterclockwise together with the central shaft 52 and the central pulley 54.

Counterclockwise rotation of the left support arm 50 through an angle of $\theta$ (rad) causes the adjustment plate 70, coupled by the pin 74 to said left support arm 50, to be rotated clockwise around the pin 72. As a result, the tightening pulley 60' urges a belt portion 58a extending between the pulleys 54 and 56' toward the outer tangential line connecting the central pulley 54 and the annular pulley 56', while the tightening pulley 61' urges a belt portion 58b away from the outer tangential line connecting the pulleys 54 and 56'. More particularly, the tightening pulley 60' is displaced so that the belt portion 58a is shortened by an amount substantially equal to the length of said belt portion wound on the central pulley 54 to prevent tension of said belt portion from being increased. The tightening pulley 61' is displaced so that the belt portion 58b is lengthened by an amount substantially equal to the length of said belt portion drawn out from the central pulley 54 to avoid a slack or decreased tension of said belt portion, as shown in FIG. 3. In this manner, the belt portions 58a and 58b are maintained at the same constant tension before, during and after the operation of interpupillary distance adjustment and, therefore, there is no rotation of the annular pulley 56'.

In view of the manner in which the tightening pulleys 60' and 61' function, the interpupillary distance adjustment causes no rotation of the annular pulleys 56 and 56' and, therefore the magnifications of both telescopic optical systems are maintained equal to each other.

When the adjustment of the interpupillary distance is reversed, that is, so as to widen the interpupillary distance, the tightening pulleys 60' and 61' function reversely with respect to the previous case and, in this case also, the annular pulleys 56 and 56' are kept stationary relative to the support arms 50 and 50', respectively.

Although the belt 58 is represented by a single solid line for simplification of the drawing, a timing belt may be utilized to avoid slippage. Correspondingly toothed pulleys may then be used as the pulleys 54, 56 and 56', in practice.

While the illustrated embodiment utilizes a single belt, it is apparent that two belts may also be used in such a manner that one belt extends between the central pulley and the left annular pulley and the other belt extends between the central pulley and the right annular pulley.

The manner in which the adjustment plate 70 is operatively associated with the left support arm 50 may also be so modified that the outer periphery of said adjustment plate circularly defined around the pin 74 comes into frictional contact with the outer periphery of said left support arm circularly defined around the central shaft 54.

Although the illustrated embodiment of the invention includes the zoom operating member connected to one of the zoom rotating cylinders, such operating member may be rotatably mounted on the central shaft, so that the left and right zoom mechanisms are interlocked by the central pulley.

As will be apparent from the foregoing description, the adjustment plate and the tightening pulleys function without activating the zoom mechanisms during adjustment of the interpupillary distance to prevent both telescopic optical systems from having different magnifications.

Use of the belt in the zoom mechanisms achieves simplified construction, smooth operation, negligible transmission loss and negligible operation noise in comparison to the gear transmission mechanism.

Furthermore, the possibility of a backlash occurring in the belt is negligibly small so that, in the zoom operation also, the magnification of both telescopic optical systems can be regulated to vary equally.

Figure 2A:
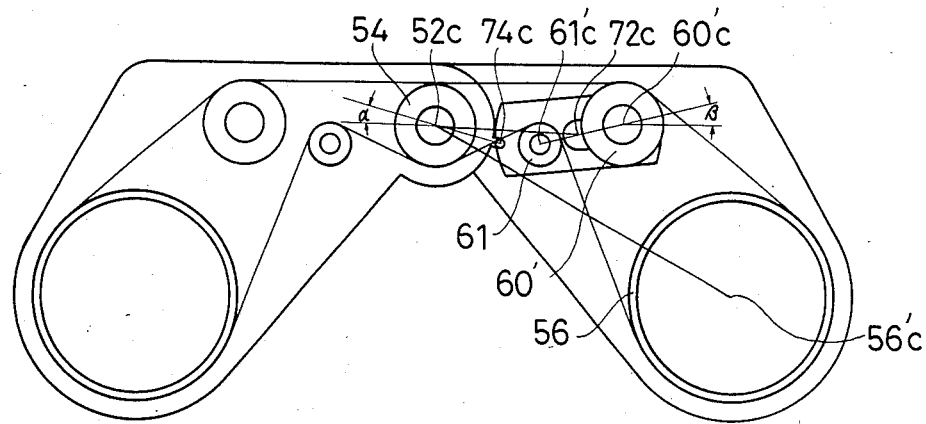
FIG. 2A is FIG. 2 on an enlarged scale.

FIG. 2A is the same as FIG. 2, but on an enlarged scale, and presents dimensions of components of a binocular built in accordance with the invention. In FIG. 2A, the central shaft 12 has an axis 52c, the annular pulley 56' has an axis of rotation 56'c, the tightening pulley 60' has an axis of rotation 60'c, the tightening pulley 61' has an axis of rotation 61'c, the pin 72 has an axis 72c and the pin 74 has an axis 74c.

The center pulley 54 has a diameter of 9.84 mm. The tightening pulley 60' has a diameter of 9.84 mm. The tightening pulley 61' has a diameter of 6.00 mm. The annular pulley 56' has a diameter of 23.42 mm.

The distance between the axes 52c and 72c which is not varied by interpupillary distance adjustment is 17.26 mm. The distance between the axes 52c and 74c which is not varied by interpupillary distance adjustment is 7.40 mm. The distance between the axes 52c and 56'c which is not varied by interpupillary distance adjustment is 41.43 mm. The distance between the axes 72c and 60'c which is not varied by interpupillary distance adjustment is 8.30 mm. The distance between the axes 72c and 61'c which is not varied by interpupillary distance adjustment is 5.40 mm.

In FIG. 2A, the axis 72c is offset about 1 mm from the straight line connecting the axes 60'c and 61'c.

The perpendicular distance between the axes 52c and 72c is 3.00 mm. The perpendicular distance between the axes 52c and 56'c is 20.50 mm.

The angle of the straight line passing through the axes 52c and 74c to the horizontal is 24.0°. The angle of the straight line passing through the axes 61'c and 60'c to the horizontal is 16.5°.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A zoom interlocking mechanism for a binocular having a pair of support arms, each provided with a telescopic optical system having an associated zoom mechanism, annular pulleys associated with respective zoom mechanisms, a central shaft affixed to one of said support arms, the other of said support arms being mounted on said central shaft for rotation within a predetermined angular range about said shaft, a central pulley coaxially mounted on said central shaft, tightening pulleys interposed between said central pulley and said annular pulleys, and a length of belt extending along a path defined by said central pulley, said annular pulleys and said tightening pulleys, said zoom interlocking mechanism comprising an adjustment plate pivotally mounted on said other of said support arms, two of said tightening pulleys being rotatably mounted on said adjustment plate at eccentric positions and biased so as to deflect portions of said belt extending between said central pulley and said annular pulley away from the outer tangential lines connecting said central pulley to said annular pulley, said adjustment plate being operatively associated with said one of said support arms in a manner whereby said adjustment plate is rotated as said support arms are rotated around said central shaft, that one of said tightening pulleys mounted on said adjustment plate and acting on the belt portion of a tension side of said belt being moved together with said adjustment plate so as to urge said belt portion toward said outer tangential lines, while the other of said tightening pulleys mounted on said adjustment plate acting on the belt portion of a slack side of said belt is moved together with said adjustment plate so as to urge said belt portion of said slack side away from said outer tangential lines, thereby maintaining the two belt portions at the same tension before, during and after adjustable rotation of said support arms around said central shaft for varying the interoptical axis distance of said telescopic optical systems.

2. A zoom interlocking mechanism for a binocular as claimed in claim 1, further comprising a pin pivotally mounting said adjustment plate on said other of said support arms, and a fixed pin affixed to said one of said support arms, and wherein said adjustment plate has an outer periphery and a groove formed in said plate at said outer periphery and substantially parallel to said pin whereby said fixed pin is engageable in said groove.

3. A zoom interlocking mechanism for a binocular as claimed in claim 1, wherein said belt comprises a timing belt.

* * * * *